Patented July 6, 1937

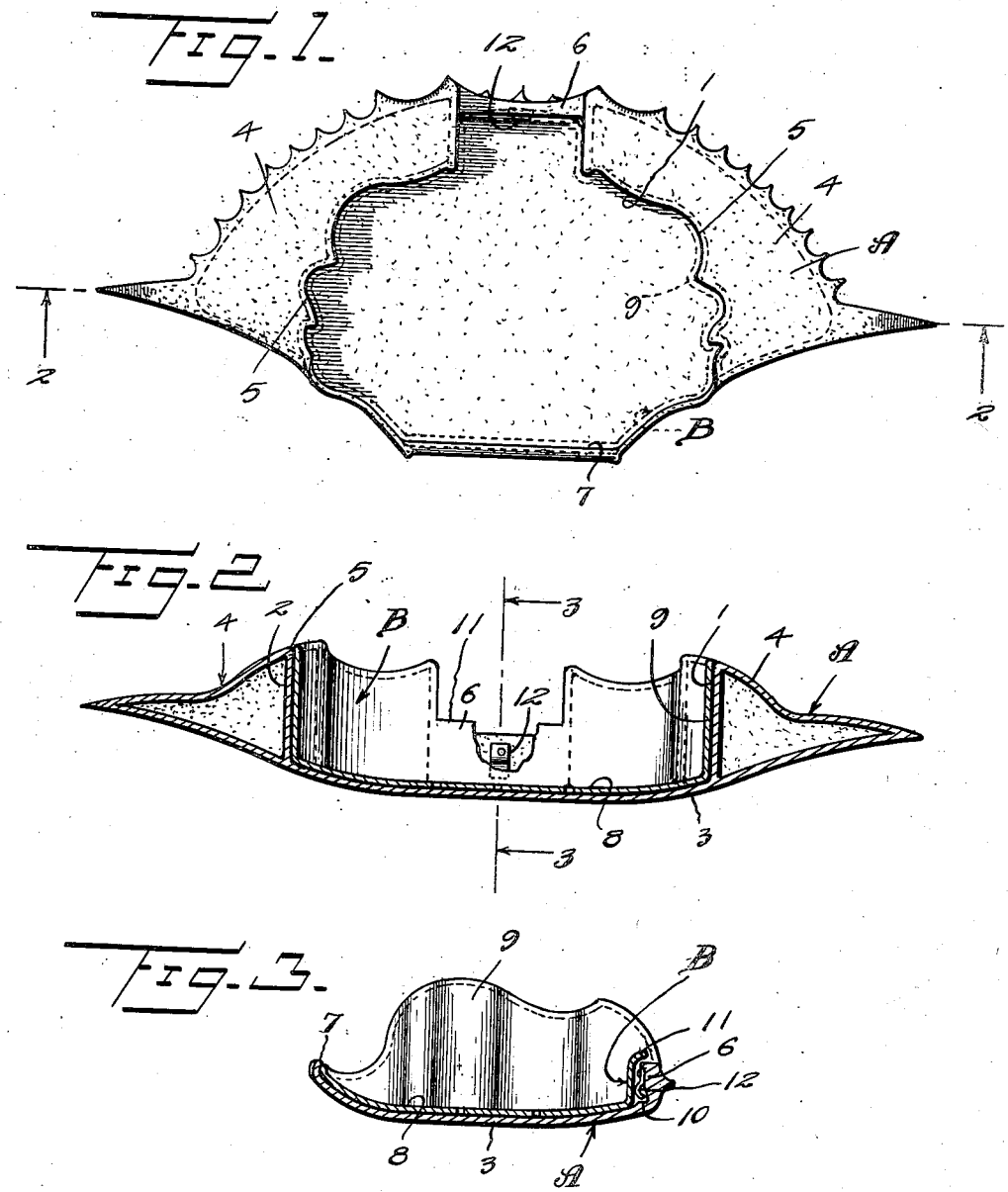

2,085,951

UNITED STATES PATENT OFFICE 2,085,951

DISH

William H. Carter and James R. Rudderforth, Washington, D. C.

Application June 16, 1936, Serial No. 85,576

1 Claim. (Cl. 65—15)

This invention relates to dishes, and it is primarily an object of the invention to provide a dish of this kind comprising two separable units adapted to be assembled for service, one of the units being preferably separated from the other to serve as a container for the cooking or other preparation of the foodstuff.

It is also an object of the invention to provide a device of this kind particularly designed and adapted for use in connection with the serving of crab meat and wherein the device in its assembly is in simulation of a crab shell.

The invention also has for an object to provide a dish particularly designed and adapted for use in the serving of crab meat and which dish is to be constructed in a manner whereby the same can be maintained at all times in a sanitary condition and thus fully comply with the health rules and regulations now generally in force or effect.

The invention consists in the details of construction and in the combination and arrangement of the several parts of our improved dish whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:—

Figure 1 is a view in top plan of a dish constructed in accordance with an embodiment of our invention;

Figure 2 is a sectional view taken substantially on the line 2—2 of Figure 1 looking in the direction of the arrow;

Figure 3 is a transverse sectional view taken substantially on the line 3—3 of Figure 1 looking in the direction of the arrow.

As herein disclosed, our improved dish comprises two separable units A and B which, when in assembled relation, closely simulate the general appearance of a crab shell. The member A is produced of any desired material but preferably of a material that can be effectively tinted or colored to further simulate the general appearance of a crab and also of a strength to effectively withstand usage.

The central portion of the body unit A and what may be termed the belly portion is cut out, as at 1, to provide a pocket or bowl closely simulating the general formation of a crab shell when viewed at one face. The marginal portion of this pocket or bowl 1 is defined by a wall 2 which bridges the space between the back wall 3 and the side top walls 4. This wall 2 in its side portion is formed to provide therealong the recesses 5 which result from the natural formation of the crab shell of which the unit A is in simulation. A central side portion of the back 3 is provided with an upstanding wall 6 of a height less than the adjacent wall 2 and the central marginal portion 10 of the unit A is disposed on a curvature to provide an inturned lip 7.

The unit B may be termed a pan and snugly fits within the pocket or bowl 1. This unit or pan B has a bottom wall 8 which snugly fits upon and conforms to the bottom of the pocket or bowl 1 and is provided with the side walls 9 substantially conforming to the wall 2 of the pocket or bowl 1 and also has a back wall 10. The upper portion of this back wall 10 is outwardly and rearwardly inclined to provide a flange or lip 11 to facilitate the removal of the unit or pan B from within the pocket or bowl 1.

The forward marginal portion of the unit or pan B between its side walls 9 is constructed and formed to engage under the lip 7 of the back 3 of the unit A to provide means for holding the unit or pan B within the pocket or bowl 1 of the unit A. This coaction of the forward marginal portion of the bottom 8 of the unit or pan B with the lip 7 also permits the lip 7 to serve as a fulcrum whereby the unit or pan B may be swung laterally down into the pocket or bowl 1. As the unit or pan B swings into the pocket or bowl 1 the back wall 10 thereof will frictionally pass over and contact with the spring member 12 suitably anchored to the back wall 10. This spring 12 provides further means for effectively maintaining the unit or pan B in applied or assembled position with respect to the unit A yet readily permits the withdrawal of the unit or pan B when desired.

In practice deviled crabs or kindred foodstuff preferably comprising crab meat, may be cooked or otherwise prepared in the unit or pan B when separated from the unit A. After the preparation the unit or pan B with its content may be placed within a refrigerating chamber or other place of storage until it is to be served. At the time of service the unit or pan B will be placed within the pocket or bowl 1 of the unit A so that when presented to the consumer it would appear that the food was being served in a natural crab shell.

After service the unit or pan B may be removed and easily and effectively cleansed as can also the unit A if desired. It is to be noted that the units A and B are free of crevices or locations where food may secrete but, on the contrary, both of the units may be thoroughly and easily cleansed so that the units of each dish may easily be kept sanitary.

It is also to be noted that the walls 9 of the unit or pan B are provided with recesses complemental to the recesses 5 of the wall 2 so that said walls 2 and 9 interlock whereby the unit or pan B cannot be removed by direct pull from within the pocket or bowl 1 of the unit A.

From the foregoing description it is thought to be obvious that a dish constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

As a new article of manufacture, a dish comprising two members, one of said members having a configuration in simulation in plan of a crab shell and comprising a bottom wall, a pair of upper walls disposed in spaced apart relation and secured at their outer marginal edges to said bottom wall, the inner confronting marginal edges of said upper walls having an irregular configuration, a pair of spaced apart inner walls having a longitudinal configuration coincident with the configuration of the inner edges of said upper walls and bridging the space between said upper walls and said bottom wall, an abutment carried by said bottom wall on one edge thereof between said upper walls, an inwardly projecting lip carried by the opposite edge of said bottom wall, the other of said members comprising a pan having a configuration such to snugly fit between said inner walls, said pan having an upstanding wall on one side thereof engaging against said abutment and terminating in an outwardly projecting finger-piece, the opposite side of said pan engaging beneath said lip, and yieldable means carried by said abutment whereby to hold said opposite side of said pan beneath said lip.

WILLIAM H. CARTER.
JAMES R. RUDDERFORTH.